Nov. 3, 1953 W. T. GRAHAM 2,657,652
IMPLEMENT-SEEDER COMBINATION
Filed July 16, 1949 6 Sheets-Sheet 1

Inventor
William T. Graham
By
*Fishburn & Mullendore*
Attorneys

Nov. 3, 1953  W. T. GRAHAM  2,657,652
IMPLEMENT-SEEDER COMBINATION
Filed July 16, 1949  6 Sheets-Sheet 2

Inventor
William T. Graham
By
Fishburn & Mullendore
Attorneys

Nov. 3, 1953  W. T. GRAHAM  2,657,652
IMPLEMENT-SEEDER COMBINATION
Filed July 16, 1949  6 Sheets-Sheet 3
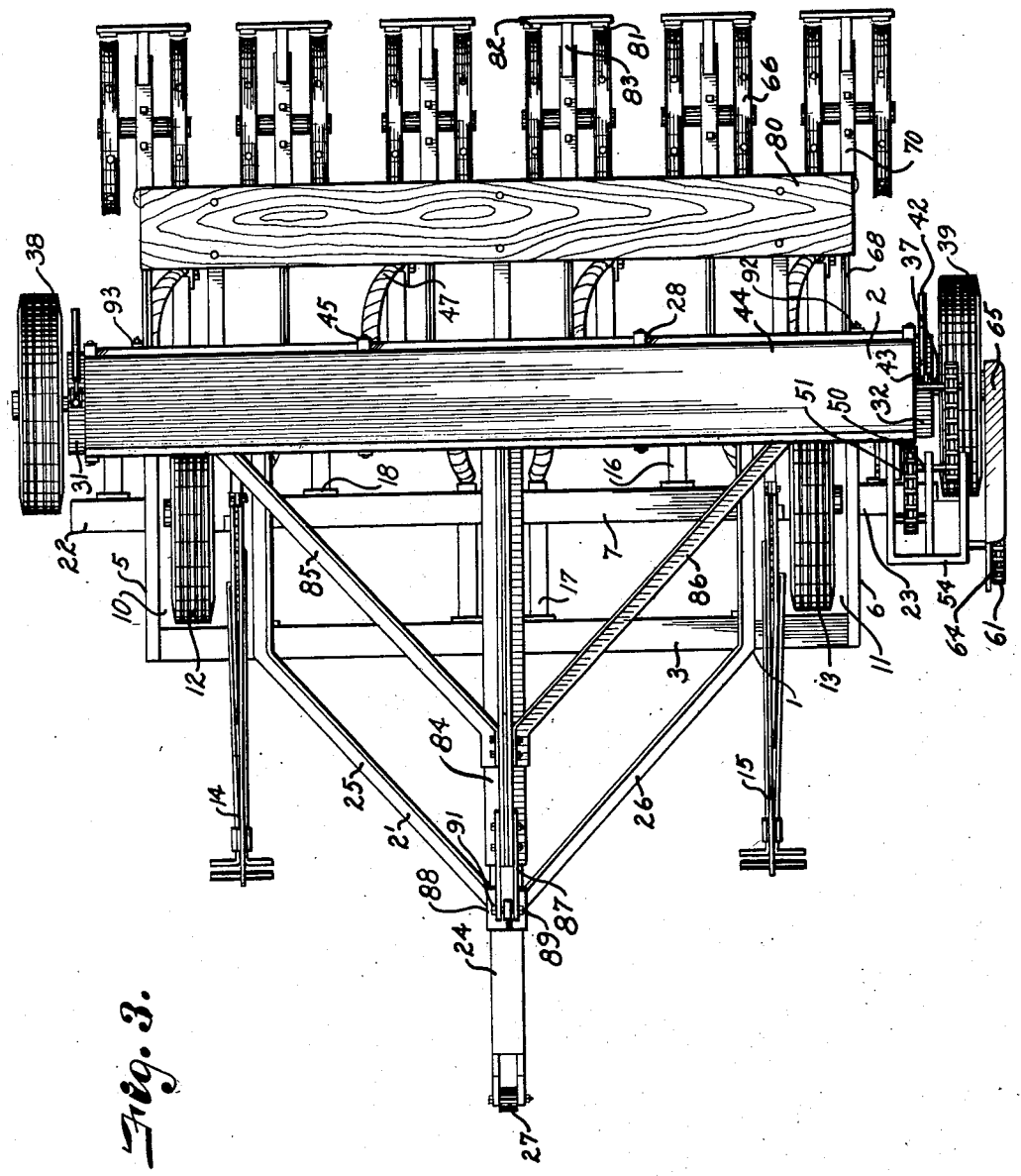
Inventor
William T. Graham
By
Fishburn & Mullendore
Attorneys Nov. 3, 1953   W. T. GRAHAM   2,657,652
IMPLEMENT-SEEDER COMBINATION
Filed July 16, 1949   6 Sheets-Sheet 4
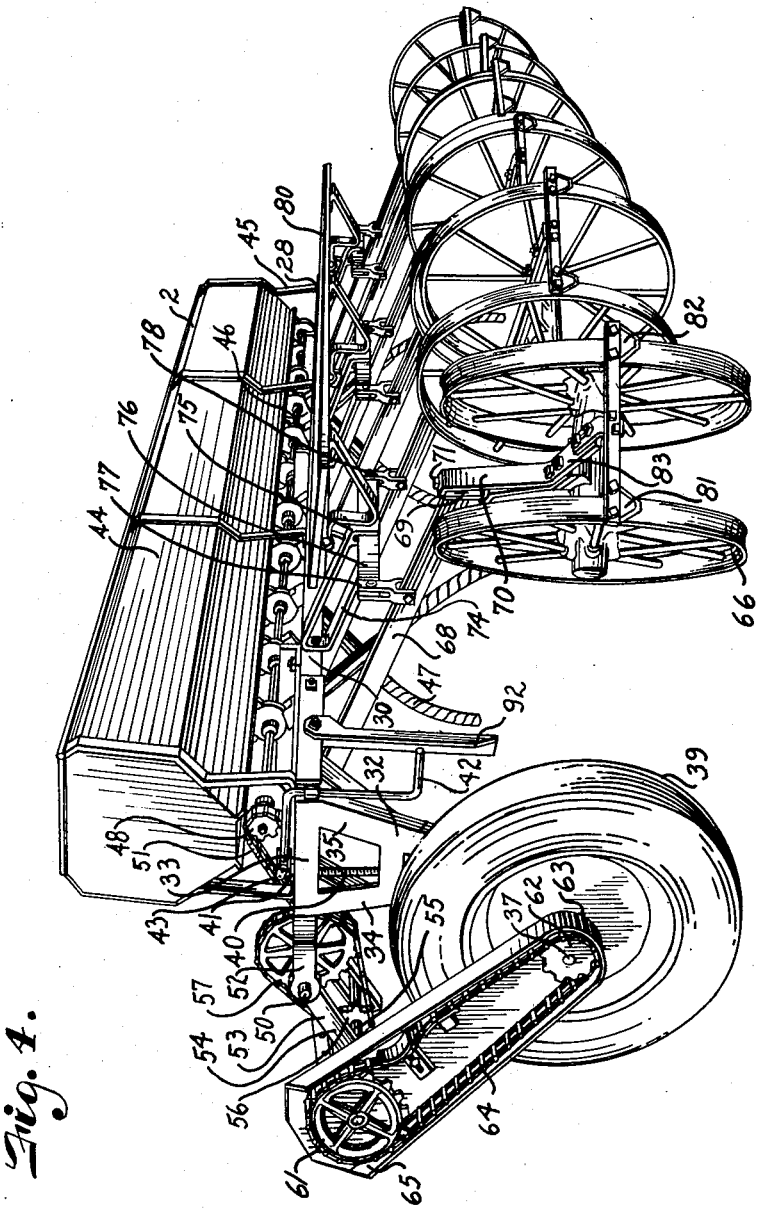
Inventor
William T. Graham
By
Fishburn & Mullendore
Attorneys

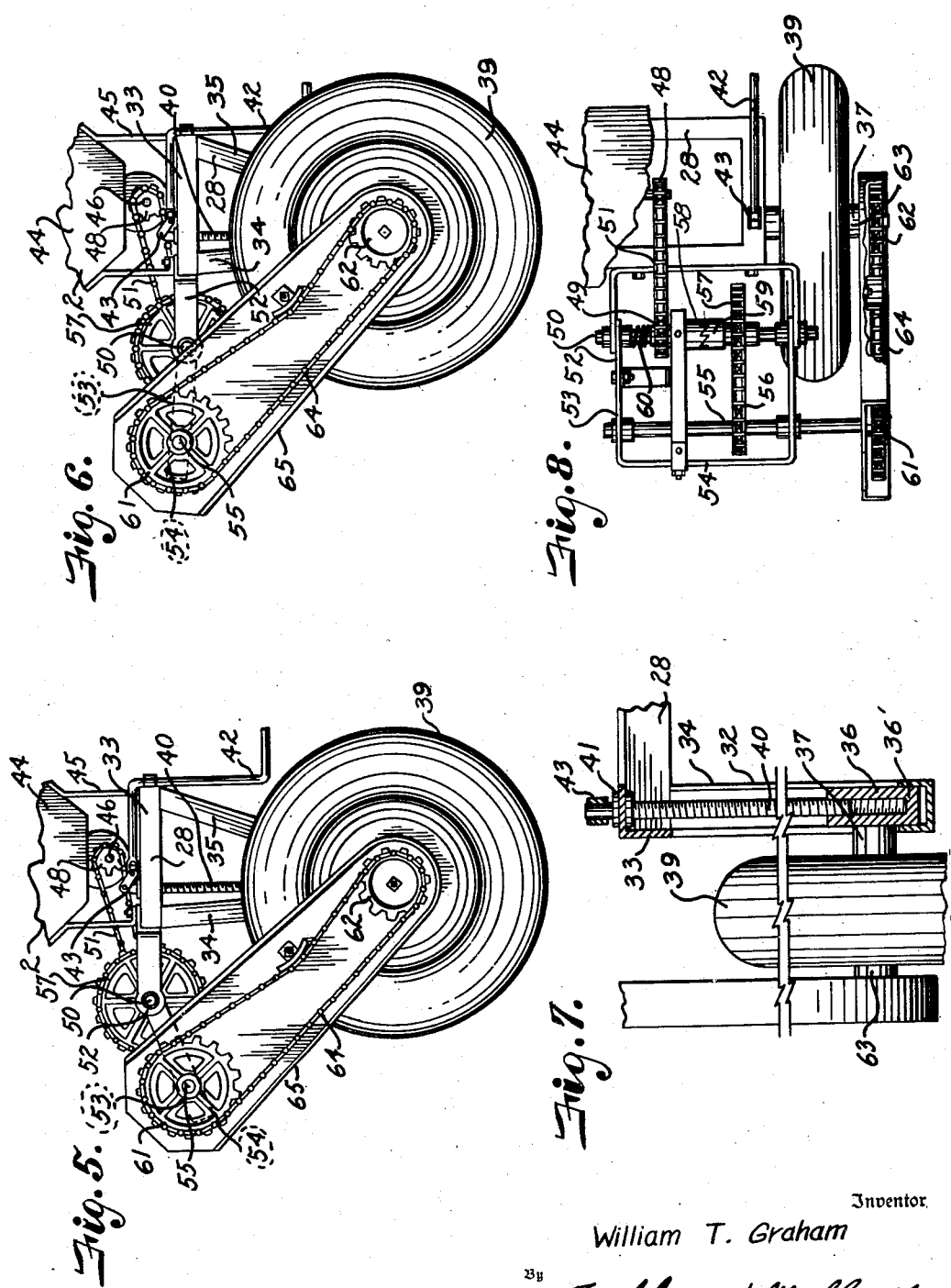

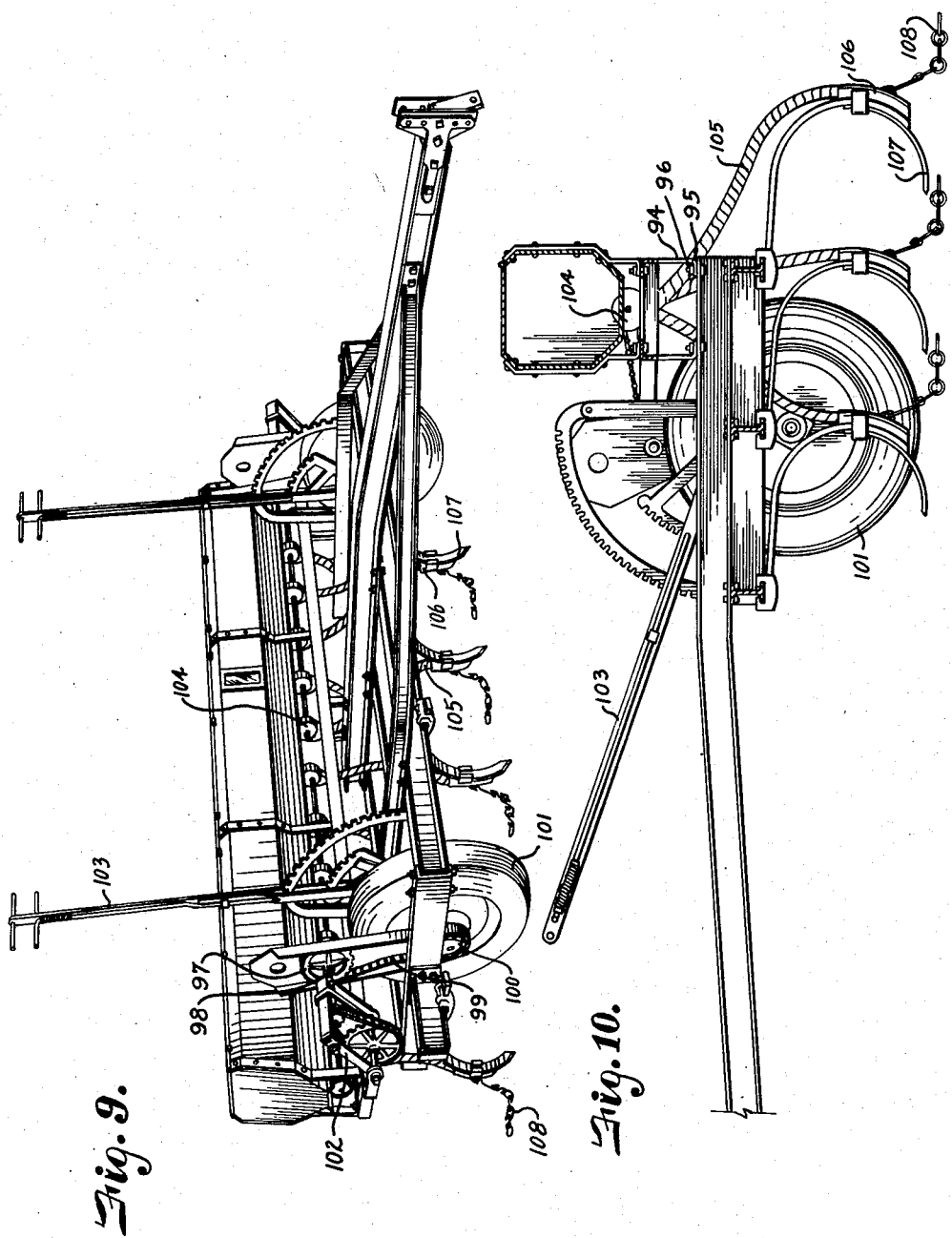

Patented Nov. 3, 1953

2,657,652

UNITED STATES PATENT OFFICE 2,657,652

IMPLEMENT-SEEDER COMBINATION

William T. Graham, Amarillo, Tex.

Application July 16, 1949, Serial No. 105,093

3 Claims. (Cl. 111—64)

This invention relates to a seeder attachment for implements particularly of the type which includes a plurality of laterally arranged ground conditioning tools that work under the surface to heave and break the soil and form alternate ridges and furrows having exposed surfaces composed of clods, straw, and other natural mulching material normally occurring on a field. After a field has been worked with an implement of this character, it is in condition to be seeded and I have found that such implements may be equipped with seeders that are directly attached thereto so that the field may be seeded at the time of working the ground, the seed being deposited in the furrow made by each furrow forming tool.

It is, therefore, the principal object of the present invention to provide a seeder for this type of implement that is wheel supported and adapted to be readily connected to the implement simply by connecting the tongue of the seeder with the tongue of the implement and inserting the seed chutes into seed boots of the ground working tools, no further connections being required.

Other objects of the invention are to provide a seeder attachment that is supported over the implement by its own wheels or on its pack wheels or both so as to vary the pressure applied by the pack wheels to the soil; to provide a seeder attachment with a driving mechanism that is actuated responsive to rotation of its wheels and independently of any connection with the implement; to provide a seeder attachment that is quickly and easily removed from the implement when the seeder attachment is not desired by disconnecting the tongue of the seeder, removing the seed chutes and pulling of the implement from under the seeder. It is also an object of the invention to provide a seeder attachment which may be applied directly on the implement frame if desired and actuated by driving connections with the wheels of the implement.

In accomplishing these and other objects of the invention, as hereinafter pointed out, I have provided improved structure, the preferred forms of which are illustrated in the accompanying drawings wherein:

Fig. 1 is a perspective view of a seeder constructed in accordance with the present invention and shown as being applied to an implement of the character referred to.

Fig. 3 is a plan view of the implement and seeder.

Fig. 4 is a perspective view of the seeder when removed from the implement.

Fig. 5 is a fragmentary side view of the seeder particularly illustrating the connection of the actuating parts of the seeder with the ground wheel of the seeder and showing the adjustment whereby the major weight of the seeder is carried by its supporting wheels.

Fig. 6 is a similar view but showing adjustment whereby the ground wheels are raised so that the major weight is carried by the pack wheels.

Fig. 7 is a fragmentary view showing the adjusting screw for adjusting the ground wheels relative to the frame of the seeder.

Fig. 8 is a fragmentary plan view at one end of the seeder particularly illustrating the driving connections and the clutch mechanism for connecting and disconnecting the drive from the seed distributing shaft.

Fig. 9 is a perspective view of an implement equipped with a modified form of the invention wherein the seeder is attached to and carried by the frame of the implement.

Fig. 10 is a longitudinal section through the implement and seeder attachment shown in Fig. 9.

Figure 1:
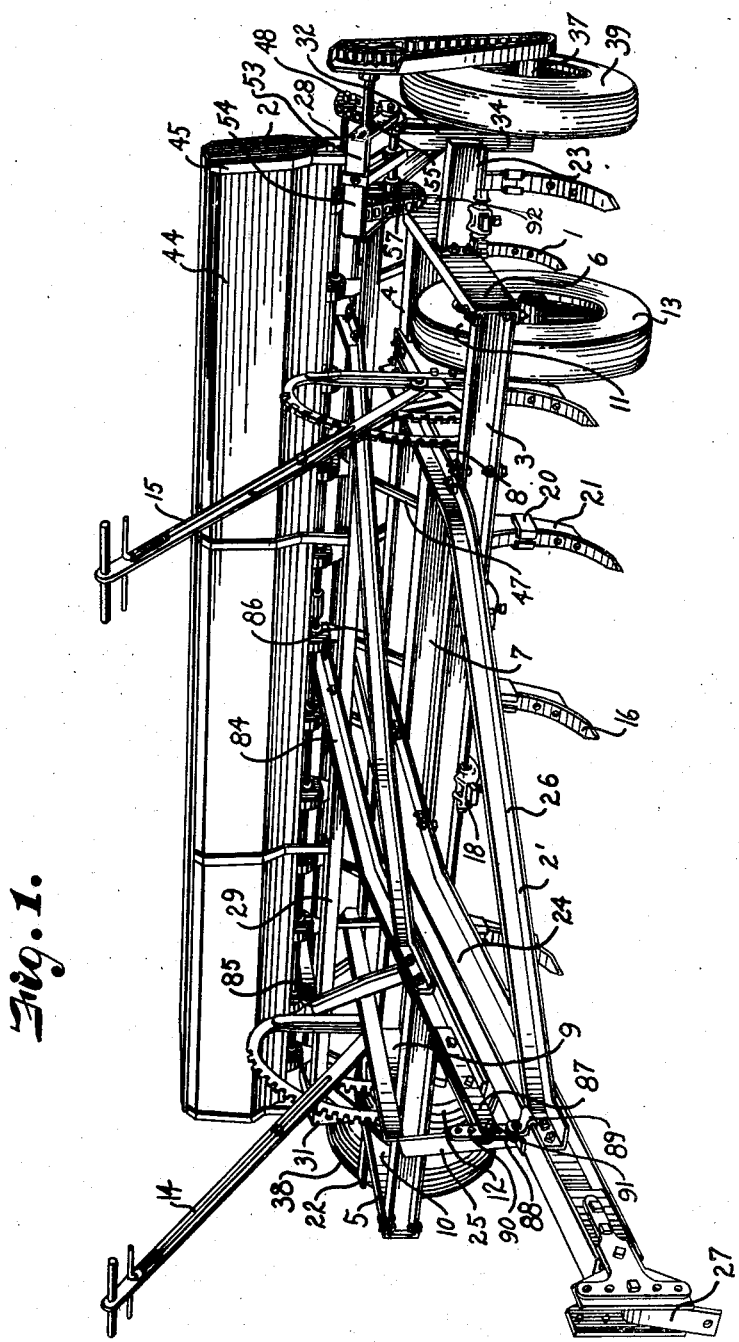

Referring more in detail to the drawings; and first to the form of the invention illustrated in Figs. 1 to 8 inclusive.

1 designates an implement and 2 a seeder embodying the features of the present invention. The implement 1 includes a frame 2' having front and rear transverse members 3 and 4 connected at the ends by longitudinal members 5 and 6. The frame also includes a centrally disposed transverse member 7 of shorter length than the transverse members 3 and 4. The member 7 is connected at the ends with the members 3 and 4 by longitudinal members 8 and 9, the members 8 and 9 being spaced from the end longitudinal members 5 and 6 to form wheel pockets 10 and 11 in which the wheels 12 and 13 of the implement are adjustably mounted for raising and lowering the wheels with respect to the frame by operating levers 14 and 15 to vary the working depth of the ground working tools 16. The ground working tools 16 are carried on resilient shanks 17 that are attached at their forward ends to the transverse members of the implement frame by suitable clamps 18. The rear ends of the shanks are curved rearwardly and downwardly as at 19 to carry the ground working tools 16 on the front sides thereof by brackets 20 having seed depositing boots 21. As above mentioned the ground working tools are spaced along the width of the implement to work under the surface of the soil and heave and break the ground, the shanks being staggered on the transverse members of the implement frame to carry the tools in position to form alternate ridges and furrows having exposed surfaces composed of straw and other natural mulching material normally occurring on a field. In order to extend the working width, the end members 5 and 6 are shown as provided with extensions 22 and 23 in line with the central transverse member 7 to accommodate ground working tools at the outer sides of the wheels of the implement as clearly shown in Figs. 1 and 3.

Extending longitudinally at the center of the transverse member of the frame is a main tongue 24 which is braced from the ends of the frame by brace members 25 and 26. The forward end of the tongue 24 carries a draft connection 27 by which the implement is connected to the draft bar of a tractor for partial support thereon.

The implement thus briefly described specifically forms no part of the present invention but is illustrated to better illustrate and describe my improved seeder now to be described.

The seeder 2 includes a frame 28 composed of front and rear transverse angles 29 and 30 having a length slightly longer than the width of the frame of the implement and which are connected at the ends by wheel-supporting brackets 31 and 32. The wheel brackets comprise inverted A-shaped members having cross portions 33 connecting the ends of the angle members and having downwardly extending legs 34 and 35 terminating in guides 36 for mounting slide blocks 36' which carry axles 37 on which the seeder wheels 38 and 39 rotate (Fig. 7). The slide blocks 36' are internally bored and threaded in a vertical direction to connect with jack screws 40 having their upper ends journaled as at 41 in the cross members 33 and which are adapted to be rotated for raising and lowering the slide blocks relative to the seeder frame by hand cranks 42 that are connected with the upper ends of the jack screw by universal joints 43. This adjustment changes the height of the seeder frame relatively to the ground and cooperates with support by the implement and pack wheels to distribute the weight of the seeder as later described.

Mounted on the seeder frame is a seed box 44 that is spaced thereabove on legs 45 to accommodate seed feeding mechanisms all driven by a common shaft 46, there being one seed feeding mechanism for each ground working tool and each is provided with a seed duct or chute having flexible ends 47 adapted for insertion in the tops of the respective boots 21. Mounted on one end of the drive shaft 46 is a sprocket 48 and operating thereover and over a sprocket 49 on a clutch shaft 50 is an endless chain 51. The clutch shaft 50 is mounted in a fixed section 52 of a frame 53 that is attached to the forward side of the seeder frame. Mounted in a pivotal section 54 of the frame 53 is a counter shaft 55 having a sprocket 56 for driving a sprocket 57 mounted on the clutch shaft and adapted to be connected in driving relation with the sprocket 49 by a jaw clutch 58, one clutch element 59 being attached to the sprocket 57 and the other having sliding keyed connection with the shaft so that when it is moved into engagement with the fixed element 59 by a spring 60 the shaft 46 is rotated to actuate the seed distributing mechanisms. The counter shaft 55 projects beyond the frame 53 and carries a sprocket 61 that registers with a sprocket 62 on the hub 63 of the adjacent ground wheel 39.

The sprockets 61 and 62 are interconnected by a chain 64 that operates thereover and which is preferably enclosed in a guard 65. In order to accommodate adjustment of the driving connections upon adjustment of the wheels 38 and 39 the pivotal section of the frame 53 turns on the clutch shaft 50. A change speed gearing may also be provided between any one of the driving elements and the actuating shaft of the seed feeding mechanism, however, this transmission is not here illustrated for the sake of simplicity. The pack wheels 66 are attached to the seeder frame as now to be described so that one wheel trails each ground working tool.

Figure 2:
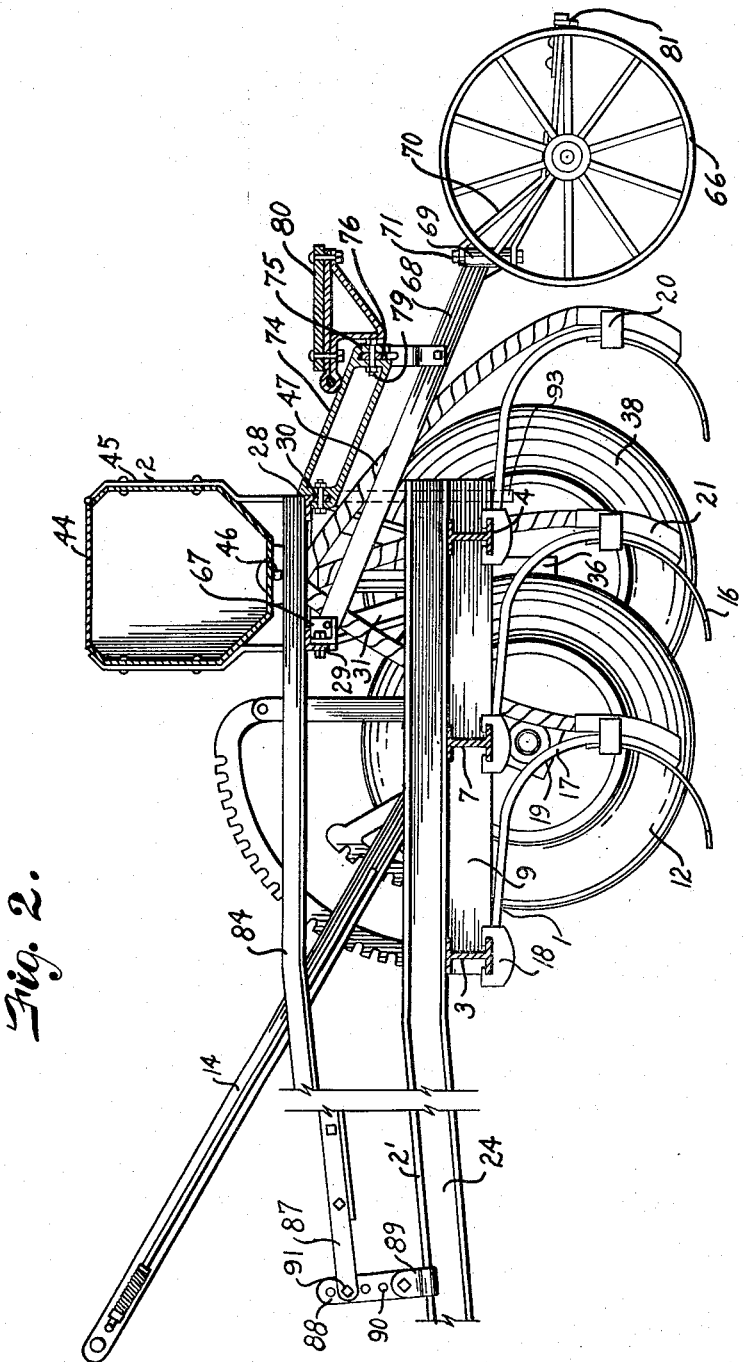
Fig. 2 is a longitudinal section through the implement and seeder shown in Fig. 1.

Pivotally mounted on suitable brackets 67 that are carried by the front angle member 29 of the seeder frame are a plurality of laterally spaced arms 68 which extend downwardly and rearwardly under the seeder frame and terminate in journals 69 for connecting yokes 70 that carry spindles 71 which turn in the journals to caster the pack wheels. The caster wheels are arranged in pairs, and the wheels of each pair are rotatable on the ends of axles which are connected at their centers to the yokes 70. The arms 68 are spaced apart along the width of the frame so that each pack wheel registers with a ground working tool of the implement. The arms 68 are also connected with the rear angle 30 of the seeder frame by brackets 74 that project rearwardly therefrom and have yoke shaped heads 75 for mounting transverse equalizing bars 76, the ends of which are connected by toggle joints 77 and 78 with the adjacent arms 68, the equalizing bars 76 being connected with the yoke shaped heads 75 by pivot pins 79 (see Fig. 2). The brackets 74 also support a platform 80 that extends along the rear side of the frame as best shown in Fig. 2.

The pack wheels may be provided with the usual scrapers 81 and 82 that are mounted on the ends of a T-bar 83 that is secured to to rearward extensions of yoke members 70.

Fixed centrally of the seeder frame is a tongue 84 that extends forwardly over the tongue of the implement and has its forward end braced from the ends of the seeder frame by brace bars 85 and 86. The tongue 84 terminates in a bar 87 that is connected with an arm 88 which is attached to the forward end of the main tongue of the implement by a clamp 89. The arm 88 has a series of openings 90 therethrough to permit adjustable attachment of the bar 87 by means of a bolt 91 that passes through a suitable opening 90 in the bar 87 and through any one of the openings 90. In order to prevent sidewise movement of the seeder attachment relative to the main frame of the implement, the seeder frame is provided at the ends thereof with depending arms 92 and 93 that engage the end frame members 5 and 6 of the implement so that the seeder and implement frame may move vertically relative to each other while the seeder frame is retained from lateral movement when the implement is making a turn in the field.

In using the seeder attachment it is drawn up to the rear of the implement so that the tongue 84 thereof extends over the tongue of the implement, the seeder being moved forwardly on its wheels to permit connection of the bar 87 with the arm 88. In this position the depending arms 92 and 93 are engaging the ends of the implement frame and the wheels of the seeder are in a position to run along the sides of the furrows made by the outermost ground working tools, or those carried by the frame extensions 22 and 23. Flexible ends of the seed ducts are then inserted within the upper ends of the seed depositing boots. When the seed box is filled with grain and the implement is drawn over the field to make the ridges and furrows as above described, rotation of the seeder wheels effect drive of the seed distributing shaft so that seeds are discharged through the seed ducts and deposited through the seed boots into the furrow behind each one of the ground working tools. The presure of the pack wheels is adjusted by adjusting a relative position of the ground wheels with respect to the seeder frame. This is effected by turning the cranks 42 in the proper direction. When the wheels are raised, more weight is applied to the pack wheels to more firmly press the soil over the seed. If less pressure is required the main seeder wheels are lowered so as to take more of the load from the pack wheels. During these adjustments the seeder tongue pivots on the bolt 91 and the arms 92 and 93 slide on the implement frame.

In the form of the invention illustrated in Figs. 9 and 10 the feeder box, seed feeding mechanisms and the drive, therefore, are substantially the same as that described in connection with the form of the invention illustrated in Figs. 1 to 8 inclusive, but these mechanisms are supported on the implement frame by brackets 94 having inturned feet 95 which are secured to flanges of the implement frame members by removable fastening devices such as bolts 96. In this form of the invention the drive sprocket 97 for the counter shaft 98, which corresponds with the counter shaft 55, is driven by a chain 99 from a sprocket 100 that is attached to one of the ground wheels 101 of the implement. A supporting frame for the driving mechanism includes a pivoted section 102 that carries the counter shaft so that it is adjustable upon adjusting of the ground wheels of the implement by means of the levers 103. The seed feeding mechanisms 104 are provided with flexible seed ducts 105 that are inserted in the seed boots 106 carried by the brackets supporting the ground working tools 107. In this form of the invention the seed may be covered by drag chains 108 that are attached to the seed boots 106.

From the foregoing it is obvious that I have provided a seeder attachment for implements of the character described, that is readily applied or removed and which effectively deposits the seed in the furrows made by the ground working tools of the implement. It is also obvious that I have provided a seeder wherein the pressure applied to the pack wheels is readily controlled by raising or lowering the ground wheels of the seeder and thereby control the packing of the soil over the seed.

In the first described form it is obvious that the seeder is a complete unit and is readily connected with the implement without requiring any driving connections as in the form of the invention shown in Figs. 9 and 10.

What I claim and desire to secure by Letters Patent is:

1. An implement and seeder combination including an implement frame supported on wheels and carrying transversely spaced ground working tools with the implement frame being adjustably supported on said wheels to vary working depth of the ground working tools, a seeder frame, means mounting the seeder frame over the implement frame for movement of the seeder frame with the implement frame including tongue means extending forwardly from the seeder frame and terminating over a forward part of the implement frame, means pivotally connecting the terminal of the tongue means with said forward part of the implement frame to flexibly interconnect said frames for vertical movement between said frames, vertical guides on one of the frames having sliding engagement with the other frame to maintain transverse relationship between the frames, ground wheels for the seeder frame transversely spaced pack wheels carried by the seeder frame with the spacing corresponding to the spacing of the ground working tools and in trailing relation with said ground working tools, means adjustably mounting the ground wheels on the seeder frame, said adjustability of the ground wheels providing for transfer of weight of the seeder frame from said ground wheels to the implement frame and the pack wheels, a seeder boot associated with each of said ground working tools, and seed depositing mechanism carried by the seeder frame for delivering seed to said boots.

2. An implement and seeder combination including an implement frame supported on wheels carrying transversely spaced ground working tools with the frame being adjustably supported on said wheels to vary working depth of the ground working tools, a seeder frame, means mounting the seeder frame over the implement frame for movement of the seeder frame with the implement frame including tongue means extending forwardly from the seeder frame and terminating over a forward part of the implement frame, means pivotally connecting the terminal of the tongue means with said forward part of the implement frame to flexibly interconnect said frames for vertical movement between said frames, vertical guides on one of the frames having sliding engagement with the other frame to maintain transverse relationship between the frames, ground wheels for the seeder frame, transversely spaced pack wheels carried by the seeder frame with the spacing corresponding to the spacing of said ground working tools and in trailing relation with the ground working tools, means adjustably mounting the ground wheels on the seeder frame, said adjustability of the ground wheels providing for transfer of the weight of the seeder frame from the ground wheels to the implement frame and the pack wheels, a seeder boot associated with each of said ground working tools, seed depositing mechanism carried by the seeder frame for delivering seed to said boots, and driving means connecting a ground wheel of the seeder frame with the seed depositing mechanism, said driving means being adjustable with adjustment of the ground wheels of the seeder frame.

3. An implement and seeder combination including an implement frame supported on wheels and carrying transversely spaced ground working tools with the frame being adjustably supported on said wheels to vary working depth of the ground working tools, a seeder frame of greater transverse width than the implement frame, means mounting the seeder frame over the implement frame for movement of the seeder frame with the implement frame including tongue means extending forwardly from the seeder frame and terminating over a forward part of the implement frame, means pivotally connecting the terminal of the tongue means with said part of the implement frame to flexibly interconnect said frames for vertical movement between said frames, depending guides on opposite sides of the seeder frame having depending sliding engagement with corresponding sides of the implement frame to maintain transverse relationship between the frames, ground wheels for the seeder frame, transversely spaced pack wheels carried by the seeder frame with the spacing corresponding to the spacing of the ground working tools and in trailing relation with the ground working tools, means adjustably mounting the ground wheels on the seeder frame, said adjustability of the ground wheels providing for transfer of the weight of the seeder frame from the ground wheels to the implement frame and the pack wheels, a seeder boot associated with each of said ground working tools, and seed depositing mechanism carried by the seeder frame for delivering seed to said boots.

WILLIAM T. GRAHAM.

References Cited in the file of this patent

UNITED STATES PATENTS

| Number | Name | Date |
|---|---|---|
| 30,876 | Galt | Dec. 11, 1860 |
| 69,484 | Ritson | Oct. 1, 1867 |
| 70,898 | Randall | Nov. 12, 1867 |
| 277,982 | Bradford | May 22, 1883 |
| 279,027 | Shortbridge | June 5, 1883 |
| 303,808 | Coleman | Aug. 19, 1884 |
| 397,342 | Davis | Feb. 5, 1889 |
| 427,420 | Howard | May 7, 1890 |
| 479,242 | Campbell | July 19, 1892 |
| 488,072 | Howard | Dec. 13, 1892 |
| 492,009 | Grafunder | Feb. 21, 1893 |
| 612,043 | King | Oct. 11, 1898 |
| 738,816 | Kindsvater | Sept. 15, 1903 |
| 904,232 | Schutt | Nov. 17, 1908 |
| 1,045,381 | Dunlap | Nov. 26, 1912 |
| 1,063,907 | Biggerstaff | June 3, 1913 |
| 1,089,948 | Nohr | Mar. 10, 1914 |
| 1,297,601 | Sherwin | Mar. 18, 1919 |
| 1,305,850 | White et al. | June 3, 1919 |
| 1,813,207 | Silver | July 7, 1931 |
| 2,061,348 | Cogdill | Nov. 17, 1936 |
| 2,155,443 | Parks | Apr. 25, 1939 |
| 2,221,909 | Clanin | Nov. 19, 1940 |

FOREIGN PATENTS

| Number | Country | Date |
|---|---|---|
| 373,605 | Germany | Apr. 13, 1923 |